Aug. 11, 1925.
H. D. GEYER
1,549,251
METHOD OF MAKING WELDED TUBE FUSELAGES
Filed July 18, 1922    4 Sheets-Sheet 1
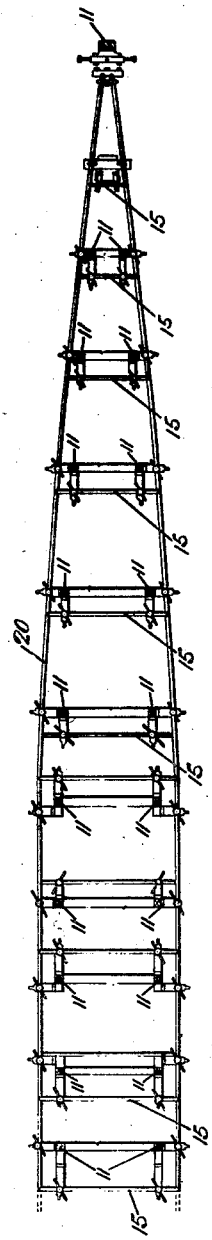
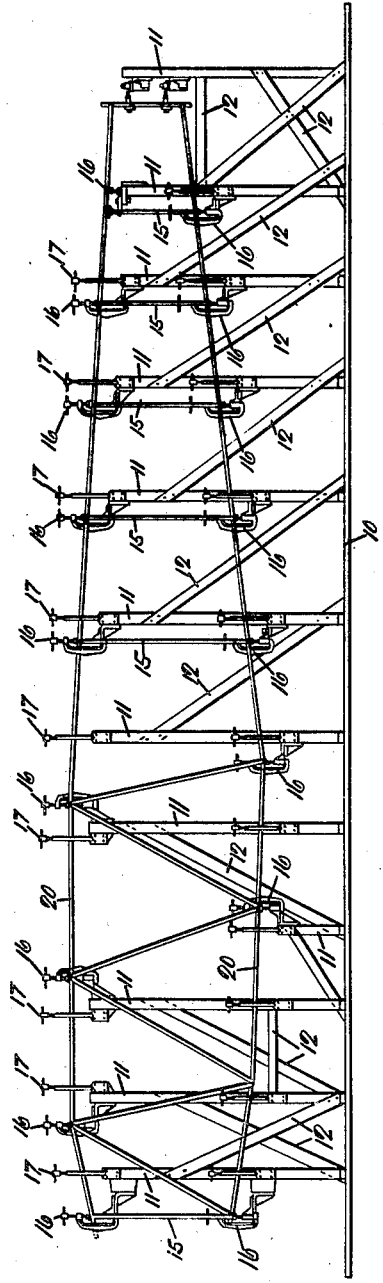
Witness.
Inventor.
Harvey D. Geyer
Ralph H. Chilton
Attorney.

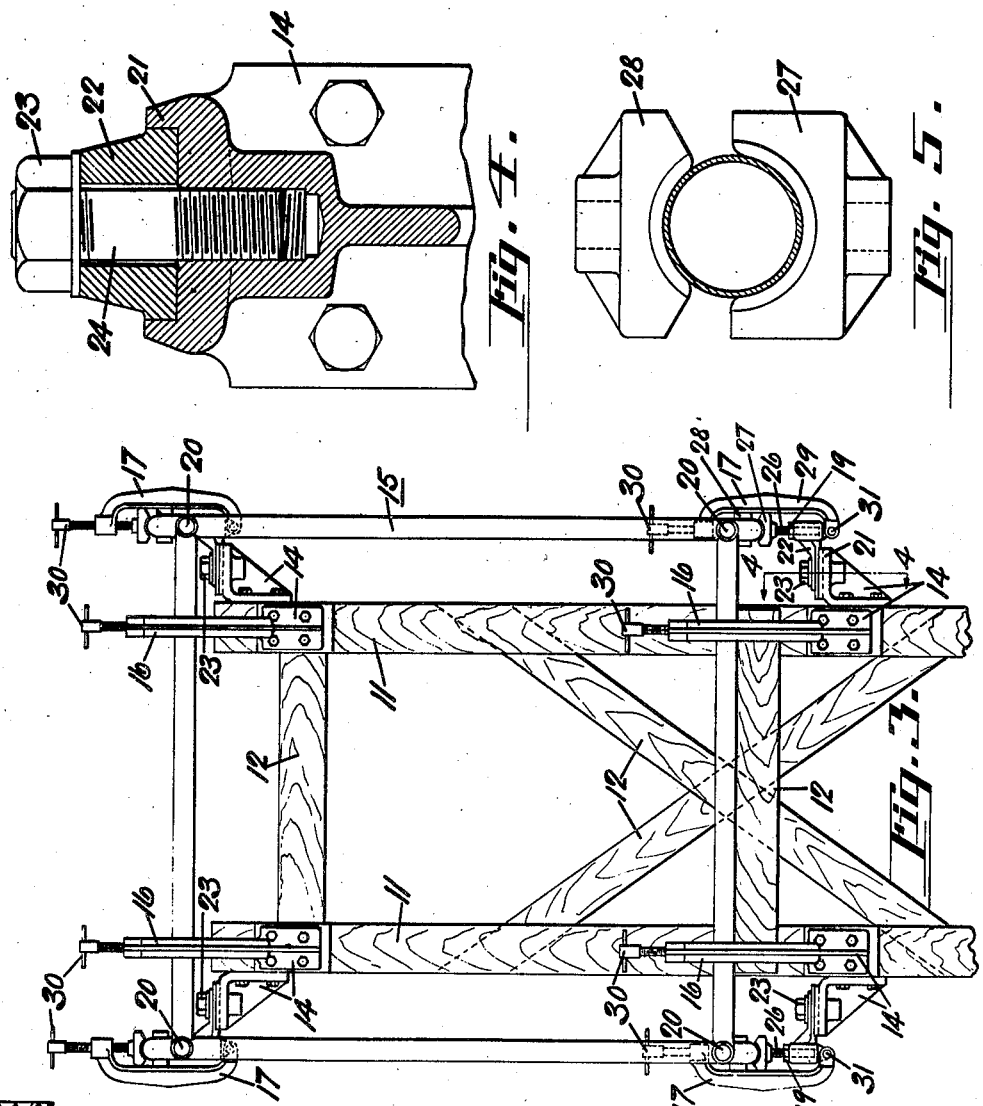

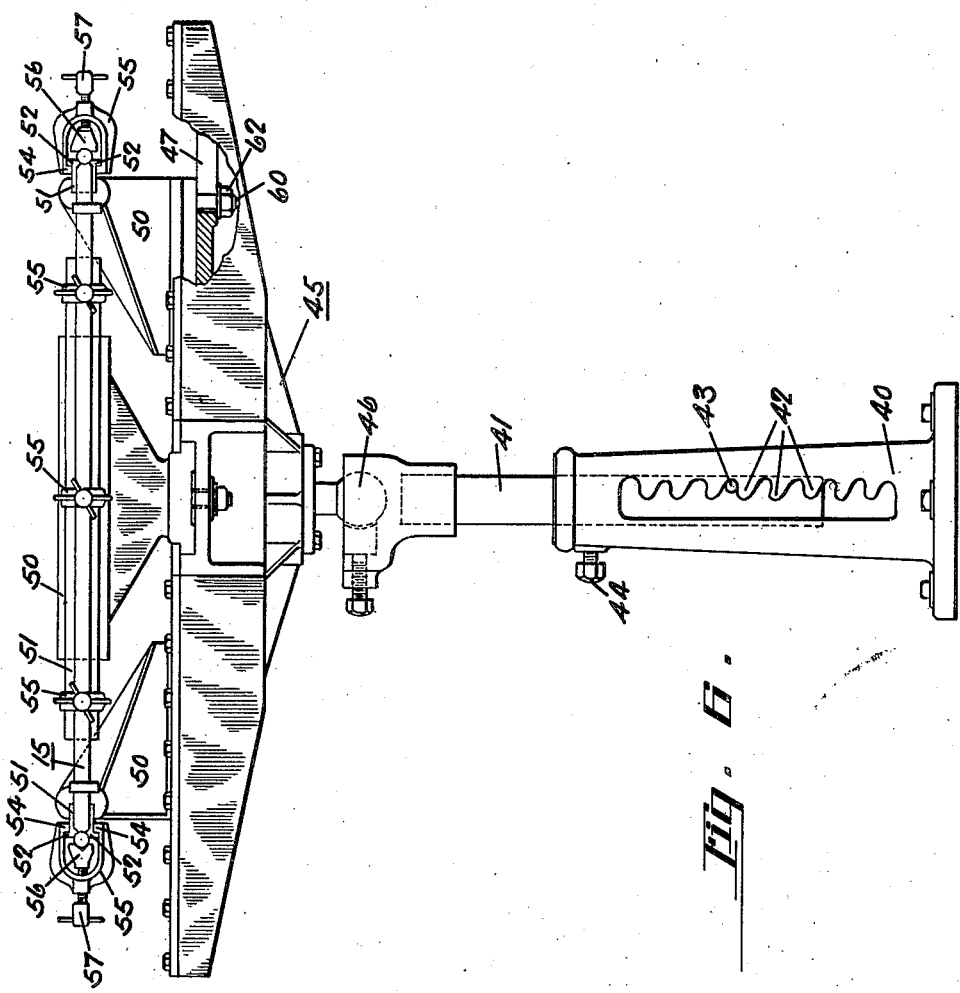

Aug. 11, 1925.

H. D. GEYER

METHOD OF MAKING WELDED TUBE FUSELAGES

Filed July 18, 1922    4 Sheets-Sheet 4

1,549,251

Patented Aug. 11, 1925.

1,549,251

UNITED STATES PATENT OFFICE.

HARVEY D. GEYER, OF DAYTON, OHIO, ASSIGNOR TO DAYTON-WRIGHT COMPANY, OF DAYTON, OHIO, A CORPORATION OF DELAWARE.

METHOD OF MAKING WELDED TUBE FUSELAGES.

Application filed July 18, 1922. Serial No. 575,769.

*To all whom it may concern:*

Be it known that I, HARVEY D. GEYER, a citizen of the United States of America, residing at Dayton, county of Montgomery, and State of Ohio, have invented certain new and useful Improvements in Methods of Making Welded Tube Fuselages, of which the following is a full, clear, and exact description.

This invention relates to a method of making welded metal structures, especially for airplanes, and to the fixtures used in carrying out said method.

An object of this invention is to provide a means and method for making welded metal fuselage structures which have no tendency to warp or distort from their true shape after welding.

Another object is to provide a welding fixture in which rigid transverse frames may be fixed in their relative positions and the longitudinal members fixed in their relative positions adjacent to said frames, whereby an entire rigid frame work may be welded together before the component parts are released from the fixture.

Another object is to provide such a welding fixture having means for releasing the airplane structure after being welded, so that said structure may be withdrawn as a whole without disassembling said fixture.

Another object is to provide an adjustable welding fixture for use in making the above mentioned rigid frames in the various sizes required in an efficient and exact manner.

Further objects and advantages of the present invention will be apparent from the following description, reference being had to the accompanying drawings, wherein preferred forms of embodiment of the present invention are clearly shown.

In the drawings:

Fig. 1 is a side elevation of the welding fixture, showing the fuselage frame work clamped in place in the fixture;

Fig. 2 is a plan view of the same, omitting the diagonal brace members 12 for the sake of clearness, and showing especially the location of the clamps for holding the fuselage parts in place so that the clamps will not interfere with the insertion of the tie rods and so that when the clamps are released after welding the fuselage may be removed as a whole;

Fig. 3 is the front end elevation on an enlarged scale of the welding fixture and fuselage parts clamped in position;

Fig. 4 is a view on line 4—4 of Fig. 3, showing the lateral adjustment means for the clamps;

Fig. 5 is a detail view of the clamp jaws for holding a tubular fuselage member;

Fig. 6 is a side elevation of the welding fixture for holding the component parts of the transverse frames in place while welding.

Throughout the drawings like or similar reference characters refer to like or similar parts.

Figure 7:
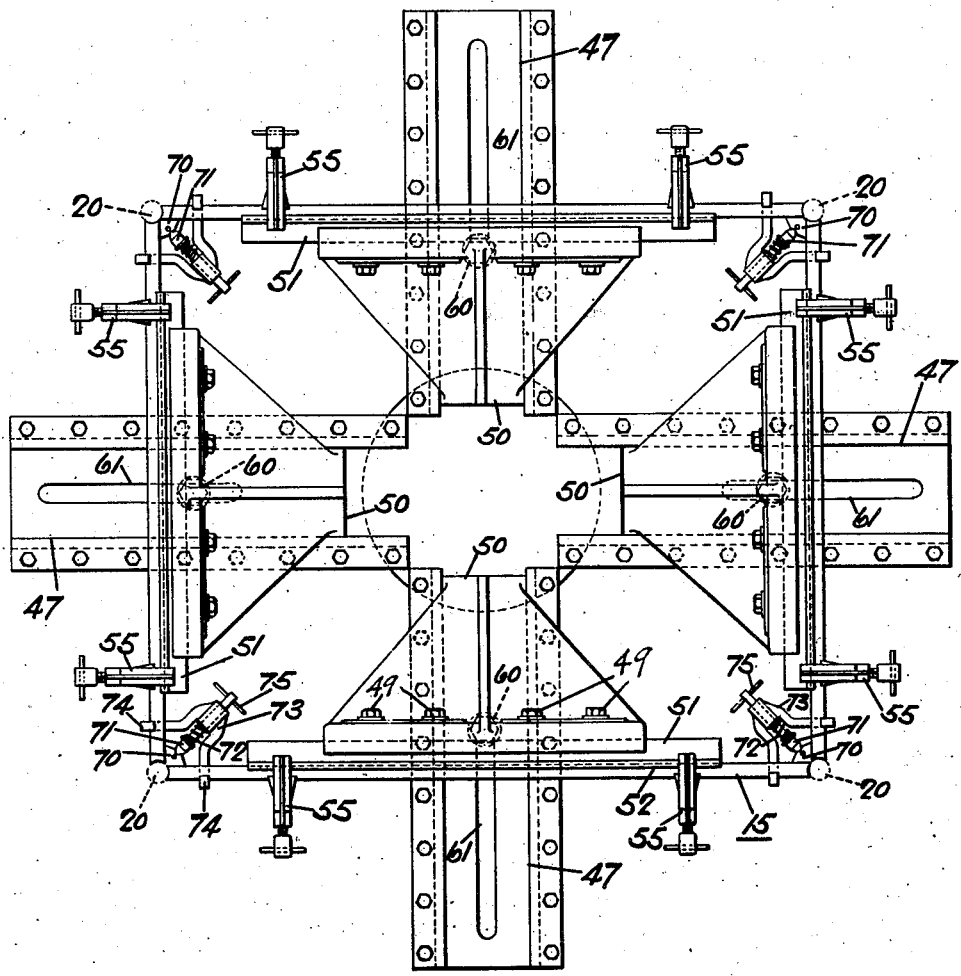
Fig. 7 is a plan view thereof showing especially the clamp for holding the corner gusset plates in place.

In Fig. 1, numeral 10 designates the base of the welding fixture to which are fastened the upright members 11 which are rigidly braced together and to the base 10 by any suitable bracing means such as indicated in the drawings at 12, the chief requirement being that the brace members 12 will not interfere with the insertion of the diagonal tie rods or the removal of the fuselage frame as a whole from the fixture after welding.

Fig. 3 illustrates clearly the adjustable clamps 16 for rigidly holding in place the horizontal transverse fuselage members, and the similar clamps 17 for holding in place the longerons 20 of the fuselage frame. The brackets 14 for the clamps 16 and 17 are preferably bolted directly to the uprights 11 and at right angles to each other as clearly shown in Figs. 1, 2 and 3. It will be seen that for each of the clamps 16 for holding the end of a horizontal transverse member in place there is a clamp 17 attached to the longeron only a short distance from the end of said transverse member, and that said clamps 16 and 17 are attached to the fixture framework at approximately the same point, thus minimizing any tendency of the joint between the transverse member and longerons before or during welding to separate or vary in any way due to any slight deflection in the fuselage members or in the fixture framework. In other words both parts of the joints to be welded are held absolutely rigid relative to each other by the two clamps being secured to the fixture frame at the same point.

The method of welding up the fuselage as a whole will now be described. A number of rigid transverse frames 15, formed by welding together upright and horizontal struts in a manner to be later described herein, are clamped rigidly in their proper relative positions by means of the clamps 16. The clamps 16 and 17 are all adjustable laterally or longitudinally by means of the guide 21 in the bracket 14 in which the part 22 is slidable by loosening the nut 23 of the stud bolt 24 (see Fig. 4). The clamps are all adjustable also in a vertical direction by screwing the threaded shank 26 of the lower jaw 27 upward or downward as desired, and locking in position by the lock nut 19. Of course it is understood that after the fuselage member is placed upon the lower jaw the swinging arm 29 which is pivoted to the part 22 at the pivot 31 is swung upwardly to its vertical position and the upper jaw 28 is screwed down firmly against the fuselage member by means of the handle 30.

After the transverse frames 15 are fixed in their exact positions the longérons 20 are then clamped in their positions. the longérons falling in the recesses in the corners of the frames 15, as most clearly shown by the dotted lines in Fig. 7. If it is desired, the longérons could be fixed in position first and the frames 15 later by inserting the frames between any two longérons on an angle and then swinging the frames to their positions perpendicular to the center line of the fuselage. Of course it is not necessary for the practice of this invention that the frames be perpendicular to the center line of the fuselage, but this is usually the case for the rearward portion of the fuselage, while in the forward part where the wings and landing chassis are attached and much heavier stresses occur, good design dictates inclining the frames either forwardly or rearwardly and usually both so as to form a truss and to make the joints fall at the desired points for the attachment of the wings and chassis.

After the longérons are rigidly clamped in place the frames are all welded thereto at their four corners (in the case of a fuselage of rectangular section), and also any other additional fuselage struts which may be inserted and welded in place singly. After welding, the diagonal tie rods (not shown) are inserted and properly tensioned to more rigidly hold the fuselage structure in its correct shape. These operations completed, all the clamps may be quickly released, the swinging arms 29 swung downward out of the way, and the entire fuselage frame withdrawn from the welding fixture from above without it being necessary to disassemble said welding fixture. It is thus seen that this method is well adapted for quantity production of welded fuselages, for all the clamps having been once positioned for a certain design of fuselage, it will not be necessary to change their positions in order to withdraw a finished fuselage frame and to set up the component parts for another.

Figs. 6 and 7 illustrate a convenient welding fixture for use in making the transverse frames 15. A stand 40 has a guide for the vertical post 41 and a series of notches 42 in any one of which the lug 43 on post 41 may rest for adjusting the vertical height of the fixture. The post 41 is held rigid by any suitable means as the set screw or bolt 44. The main frame 45 of the fixture is adjustably mounted upon the top of post 41 by the ball and socket joint 46, by means of which the frame 45 may be adjusted to a vertical or horizontal position or any intermediate position, as well as being rotatable on its axis. The frame 45 is provided with the four guides 47 extending mutually perpendicular to one another. Slidably arranged in each of these guides 47 is a head 50 to which the clamping means for rigidly holding the fuselage parts are fixed. These clamping means may be of any suitable design. In the drawings, I have shown a long block 51 held to the head 50 by the bolts 49, the face of block 51 having a V-shaped groove therein to receive the fuselage member 15. The block 51 is also provided with upper and lower flanges 52 along its entire length against which the inwardly turned lugs 54 of the clamps 55 abut (see Fig. 6). These clamps 55 are provided with a block 56 adapted to be screwed inwardly by the handle 57 to rigidly and securely clamp the fuselage member 15 between said block 56 and the V-grooved block 51. Any desired number of clamps 55 may be used and they may be positioned at any point along the length of the blocks 51. The clamps 55 are quickly removable by loosening the handle 57 and sliding them off over the ends of block 51. The rectangular dimensions of the bulkhead to be welded upon this fixture is accommodated by adjusting the heads 50 along the guides 47. A simple means for locking the heads 50 in their adjusted positions is shown in Figs. 6 and 7, comprising a stud bolt 60 in the bottom of the head 50 and extending through the elongated slot 61 in the bottom of the guide 47 and having the locking nut 62 thereon.

An important feature of the invention is the method of welding up the transverse frame struts to form a rigid frame while at the same time leaving recesses at the corners in which the longérons may fit so that the center lines of the longérons and struts will intersect at a common point. This is accomplished by using a small gusset plate 70 at the corners of the frame to which the ends of the struts are welded. These gusset plates 70 are held in position for welding by the spring clamps or holders, 71. The gussets 70 are held in a slot in the end of member 71 which in turn is forced tightly up in the corner by the spring 72. The bracket 73 in which the member 71 is slidably mounted is held against the struts by two up turned hooks 74 and the force of the spring 72. Preferably short slots or grooves are also cut in the ends of the struts to aid in holding the gussets 70 in place before welding and also to give a stronger welded joint at these points. After welding, the holders 71 are easily withdrawn from the gussets 70, by pulling on the handles 75, whereupon the brackets 73 become unhooked from around the struts.

While the forms of mechanisms herein shown and described constitute preferred forms of embodiment of the present invention, it is to be understood that other forms might be adopted, all coming within the scope of the claims which follow.

What I claim is as follows:

1. The method of making welded tube fuselages, which comprises separately forming rigid transverse frames by welding the component members of said frames together by use of gusset plates and leaving the outer corners of said frames shaped to fit the longérons, rigidly securing said frames in their correct relative positions, rigidly securing longérons in their correct relative positions adjacent the outer corners of the bulkheads, and then welding the longérons and frames together to form a rigid fuselage construction.

2. The method of making an elongated fuselage framework, comprising separately forming rigid transverse frames of various dimensions for the various sections of the fuselages, rigidly clamping said frames in a fixture in their correct relative positions, rigidly clamping longérons in a fixture so that the longérons will lie in their correct relative positions adjacent said frames, and then welding the longérons to the frames while said longérons and frames are held fixed.

3. The method of making an elongated fuselage framework, comprising separately forming rigid transverse frames of various dimensions for the various sections of the fuselage, rigidly clamping said frames in a fixture in their correct relative positions, rigidly clamping longérons in a fixture so that the longérons will lie partly within recesses in the corners of said transverse frames, and then welding the longérons to the frames while they are all held fixed.

4. The method of making an elongated fuselage framework, comprising separately forming rigid transverse frames of metal tubular struts, rigidly clamping said frames in a fixture in their correct relative positions, rigidly clamping tubular metal longérons in a fixture so that the longérons will lie adjacent the corners of said transverse frames, and then welding the longérons to the frames while said longérons and frames are held fixed.

5. The method of making an elongated fuselage framework, comprising separately forming rigid transverse frames of metal tubular struts, rigidly clamping said frames in a fixture in their correct relative positions, rigidly clamping tubular metal longérons in a fixture so that the longérons will lie partly within recesses in the corners of said transverse frames so that the axes of the longérons and the tubular struts of the frames intersect substantially at a common point, and then welding the longérons to the frames while said parts are held fixed in the fixture.

6. The method of constructing a welded tube fuselage framework, comprising separately forming rigid transverse frames of metal tubular struts by welding said struts together by use of corner gusset plates, rigidly clamping said transverse frames in a fixture in their correct relative positions, rigidly clamping longérons in a fixture in their correct relative positions so that they lie adjacent the ends of the struts of the transverse frames at the corners of said frames, and then welding the longérons and the ends of the struts of said frames together to form a rigid framework while said parts are all held fixed in their correct relative positions.

7. The method of making a welded metal fuselage, comprising separately forming rigid transverse frames of metallic struts welded together at the corners of said frames, rigidly securing said frames in a fixture in their correct relative positions, welding the longéron members to the corners of said frames to form a single rigid construction, applying and tensioning diagonal tie members to said transverse frames to prevent distortion of the construction upon removal from the fixture, and then removing the construction from the fixture.

8. The method of making a welded metal fuselage, comprising separately forming rigid transverse frames of metallic struts welded together at the corners of said frames, rigidly securing said frames in a fixture in their correct relative positions, rigidly securing longéron members in a fixture in their correct relative positions adjacent the corners of said frames, welding the longéron members to the corners of said frames to form a single rigid construction, applying and tensioning diagonal tie members to said transverse frames to prevent distortion of the construction upon removal from the fixture, and then removing the construction from the fixture.

9. The method of making a welded metal fuselage, comprising rigidly securing all the longéron members in a fixture in their correct final relative positions, welding vertical and horizontal struts to said longérons in such positions as to form transverse frames interconnecting said longérons applying and tensioning diagonal tie members to said transverse frames to prevent distortion of the construction upon removal from the fixture, and then removing the entire construction from the fixutre.

In testimony whereof I hereto affix my signature.

HARVEY D. GEYER.